Figure 1:
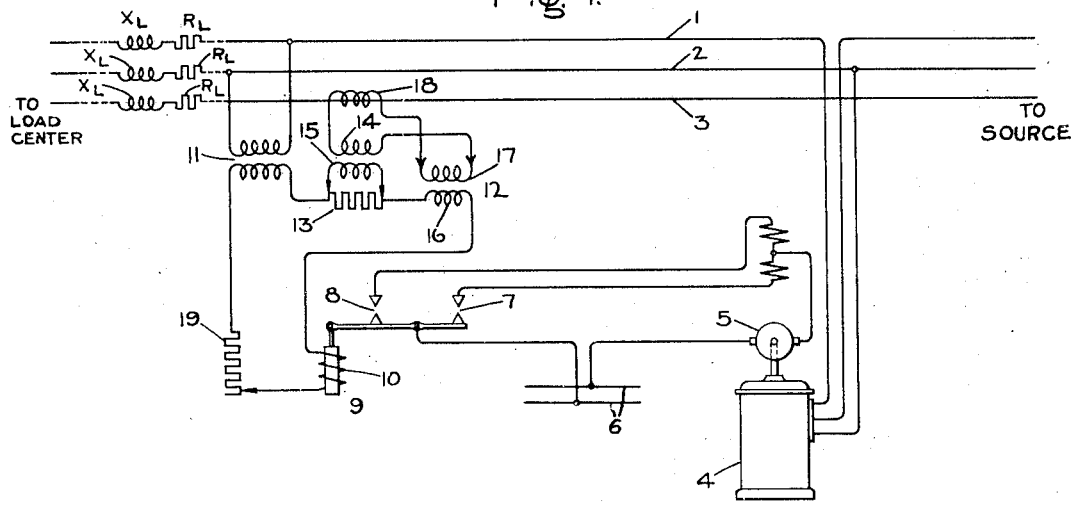

Jan. 19, 1937.　　　Z. O. ST. PALLEY　　　2,068,576

LINE DROP COMPENSATION

Filed Nov. 5, 1935

Inventor:
Zoltan O. St. Palley,
by Harry E. Dunham
His Attorney.

Patented Jan. 19, 1937

2,068,576

UNITED STATES PATENT OFFICE 2,068,576

LINE DROP COMPENSATION

Zoltan O. St. Palley, Pittsfield, Mass., assignor to General Electric Company, a corporation of New York Application November 5, 1935, Serial No. 48,352

6 Claims. (Cl. 171—119)

My invention relates to line drop compensation and more particularly to an improved arrangement for securing line drop compensation in connection with three-phase isolated neutral alternating current circuits with balanced loads.

By line drop compensation I mean the compensation of a voltage sensitive electro-responsive device which is connected at one place on a circuit for the voltage drop in the circuit between that place and another place thereon. Such compensation is usually necessary in automatic voltage regulating systems for distribution and transmission circuits because in such systems it is usually not feasible to connect the voltage responsive main control device for the regulating system to respond directly to the voltage at the load center or point on the circuit where it is desired to maintain a substantially constant voltage regardless of load changes.

A line drop compensator usually consists of individually adjustable resistance and reactance elements arranged to produce voltages or voltage drops in the energizing circuit of the voltage sensitive control device which corresponds respectively to the resistance and reactance drops in the regulated circuit. As the voltage sensitive control device always controls the regulator in such a manner as to maintain the voltage at the terminals of the voltage sensitive device substantially constant it will be seen that the regulator will normally hold a higher voltage at the point where the voltage sensitive device is connected to the circuit than the voltage which it is desired to hold constant at the load center by reason of the voltages introduced in the energizing circuit of the voltage sensitive device by the line drop compensator. As the line drop compensator voltages correspond to the components of the impedance drop in the circuit this higher voltage at the point where the voltage sensitive device is connected to the circuit will be just sufficient to compensate for the impedance drop in the circuit so that constant voltage is maintained at the load center regardless of changes in load current.

The conventional way to energize a line drop compensator is by means of a current which is proportional to the current in the regulated circuit and which is in phase with the voltage to which the voltage sensitive device responds at unity power factor of the circuit. With single phase circuits there is no difficulty in doing this because the line current and line-to-line voltage will be in phase at unity power factor. Also with grounded neutral polyphase circuits there is no difficulty because the line-to-ground voltage will be in phase with the current in that particular line at unity power factor. However, in ungrounded neutral polyphase system circuits such as three-wire, three-phase circuits, there is a 30° phase angle difference between the line-to-line voltage and the current in either of the two lines between which the voltage is measured, at unity power factor of the circuit.

Correction for this phase angle has been made in numerous ways in the past. At first it was done outside the compensator by means of an auxiliary current transformer for producing a resultant current which was in phase with a particular line-to-line voltage. For example, if two current transformers are cross-connected so that their output corresponds to the vector difference between the current of the two lines between which the voltage is measured, the resultant current will be in phase, at unity power factor, with the line-to-line voltage. It will be seen, however, that such an arrangement requires an extra current transformer which increases the cost and complexity of the system. A very common way of regulating the voltage of such a three-phase circuit is by means of two single phase regulators connected in different conductors so as to produce an open delta type voltage regulation. In such systems a modification of the above referred to two-current transformer method has been used which requires three-current transformers for the two regulators or line drop compensators. Such an arrangement, of course, is an improvement over the two-current transformer arrangement for with two regulators the two-current transformer arrangement would obviously require four-current transformers.

It has also been proposed to correct for the 30° phase angle difference between the voltage and current in a three-phase ungrounded neutral circuit within the line drop compensator itself. Thus, the resistance and reactance elements of the compensator can be adjusted so that the resultant impedance drop produced by the flow of a 30° phase displaced current therethrough will bear the same phase relation to the voltage applied to the voltage control device as exists between the impedance drop in the circuit and the circuit voltage. Such an arrangement, however, requires relatively complicated and laborious calculation of the necessary compensator reactance and resistance values as these values do not bear a simple relation to the reactance and resistance values of the regulated circuit such as is the case in a simple circuit where the current and voltage are normally in phase at unity power factor. In the latter case the compensator resistance and reactance values are directly proportional to the resistance and reactance of the regulated circuit. Furthermore, as the 30° angle difference is a leading angle for one phase and a lagging angle for the other phase, separate sets of calculations are required. This results in considerable trouble and difficulty in using such a type of correction for the 30° angle.

In accordance with my invention I provide an improved arrangement for securing the above correction by energizing the line drop compensator with a current which is in quadrature with the voltage applied to the voltage sensitive electro-responsive device at unity power factor combined with an inverse setting of the compensator. By inverse setting, I mean a setting such that the ratio of resistance to reactance in the compensator is inversely proportional to the ratio of resistance to reactance of the line or regulated circuit. In other words the magnitude of the resistance element in the compensator corresponds to the reactance of the line and the magnitude of the reactance element in the compensator corresponds to the resistance of the line. Such an inverse setting is just as simple and easy to make as an ordinary direct setting and if desired the external markings on the compensator may be reversed so that an operator setting the compensator need not even know that the setting is an inverse one. For example, most compensators consist of a box having individually rotatable resistance and reactance adjusting knobs or handles provided with pointers co-operating with scales for indicating the values of resistance and reactance compensation. By merely reversing the labels or indicia on the face plate of the compensator the inverse setting will automatically take care of itself for the operator, once he knows the resistance and reactance of the line, he may then set the compensator in the ordinary manner according to the face plates of the compensator, although in reality when he is adjusting what is labeled the resistance he will be adjusting the reactance element of the compensator and vice versa.

With the above-described arrangement it is also necessary to reverse or make negative the reactance element of the compensator relative to the resistance element. This may be done on any standard compensator by merely reversing the internal connections of the reactance element with respect to the resistance element. However, if desired, the resistance element may have its connections reversed relatively to the reactance element and the current transformer secondary connections may be reversed to the compensator. This in the end amounts to the same thing as reversing the reactance element relatively to the resistance element. However, both such reversals may be made without the addition of any parts and by a mere change in connections of ordinary standard apparatus.

An object of my invention is to provide a new and improved line drop compensating arrangement.

Another object of my invention is to provide a line drop compensator connection which is adapted for use with isolated neutral three-phase circuits, which utilizes hitherto existing standard apparatus, which requires but one current transformer, which does not require interconnection between the regulators when used in connection with two single phase regulators for regulating the voltage of the circuit, and which does not require special calculations of resistance and reactance values of the compensator.

My invention will be better understood from the following description taken in connection with the accompanying drawing and its scope will be pointed out in the appended claims.

Figure 2:
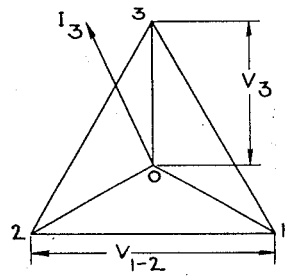
Figure 3:
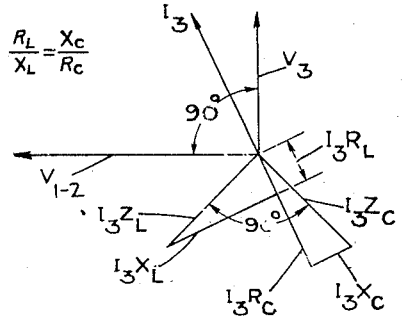
Figure 4:
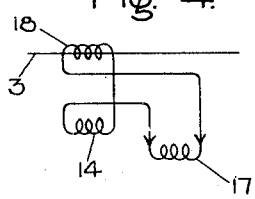
Figure 5:
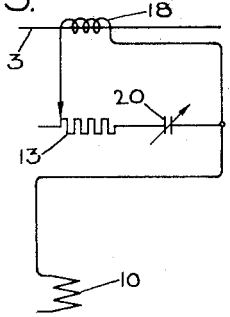

In the drawing, Fig. 1 is a diagrammatic representation of an embodiment of my invention, Fig. 2 is a vector diagram showing the phase relations of the currents and voltages in a three-phase circuit, Fig. 3 is a vector diagram illustrating the principle of operation of my invention, Fig. 4 shows a modified way of obtaining relative reversal of one of the elements of the compensator and Fig. 5 is another modification utilizing an adjustable capacitor as a negative or reversed reactance element of the compensator.

Referring now to the drawing and more particularly to Fig. 1 thereof, there is shown therein a three-phase, three-wire ungrounded neutral circuit comprising conductors 1, 2 and 3 (whose resistance and reactance are represented symbolically by $R_L$ and $X_L$) to which a single-phase voltage regulator 4 is connected. This regulator may be any of the well known types and is shown as an induction voltage regulator having its primary winding connected between conductors 1 and 2 and having its voltage adjusting series winding connected in conductor 1. Regulator 4 is operated in the conventional manner by means of a reversible motor 5 which is energized from a suitable control current supply circuit 6 and whose direction of rotation is controlled by a set of "raise" and "lower" contacts 7 and 8 respectively, on a voltage sensitive electro-responsive controller 9 which is shown by way of example in the form of a contact making voltmeter. This device has a main operating winding 10 which is connected so as to respond to the line-to-line voltage between conductors 1 and 2 of the three-phase circuit, preferably by means of a suitable potential transformer 11.

In circuit with the operating winding 10 is a line drop compensator 12. The resistance element of the compensator 12 consists of a resistor 13 and an insulating transformer having a primary winding 14 and a secondary winding 15 with adjustable terminals which may be moved relatively to the resistance 13 so as to vary the value of resistance across which the secondary winding 15 is connected, thereby to vary the value of the resistance element. The reactance element of the compensator consists of a reactance transformer having a secondary winding 16 connected in circuit with the main winding 10 of the contact making voltmeter 9 and a primary winding 17 with adjustable taps so that the ratio of the reactance transformer can be varied, thereby varying the reactance value of the reactance element of the compensator. The line drop compensator 12 is energized from a current transformer 18 connected in line conductor 3 of the three-phase circuit and the primary windings 14 and 17 are connected in series but with the primary winding 17 of the reactance transformer reversed with respect to the way it is usually connected when the current in the current transformer is in phase with the voltage of the potential transformer at unity power factor on the circuit.

An adjustable resistor 19 is connected in series with a winding 10 for reducing the frequency and temperature errors, and for adjusting the setting of the contact making voltmeter 9.

In the general operation of the system shown in Fig. 1 the resistor 19 is adjusted so that the meter 9 is balanced at a particular voltage corresponding to the voltage it is desired to maintain constant at the load center. Under these circumstances the contacts 7 and 8 are open so that the motor 5 is de-energized and the regulator 4 is stationary. Should the voltage of the main circuit rise or fall this change in voltage will be transmitted through the potential transformer to the winding 10 closing the "lower" contact 8 or the "raise" contact 7, thereby causing the motor 5 to operate in such a direction that the regulator 4 either lowers or raises the voltage of the circuit and this action continues until the meter 9 again becomes balanced whereupon the motor is de-energized and the regulator comes to rest. If current flows in the main circuit a current proportional to the current in conductor 3 will flow in the primary windings 14 and 17 of the resistance and reactance elements of the line drop compensator thereby producing resistance and reactance voltages in the circuit for energizing the main winding 10 of the electro-responsive controller 9. Ordinarily this will mean that the voltage applied to the winding 9 will be less than the voltage of the secondary winding of potential transformer 11 by the vector sum of the resistance and reactance voltage in the compensator. This is another way of saying that the voltage between the conductors 1 and 2 (assuming a one to one ratio potential transformer 11) will be higher than the voltage applied to the contact making voltmeter winding 10 by an amount corresponding to the impedance drop in the line drop compensator. If the compensator is adjusted so that the impedance drop in the circuit energizing the winding 10 corresponds to the impedance drop between the point or place where the primary winding of 11 is connected between the conductors 1 and 2 and the place, such as the load center, where it is desired to maintain constant voltage, then with changes in current in the circuit the voltage between the conductors 1 and 2 at the place where the primary winding of the potential transformer 11 is connected thereto will vary so as to compensate for the line drop and maintain substantially constant voltage at the load center regardless of changes in current.

The particular way in which the line drop compensator of Fig. 1 operates can best be understood by reference to the vector diagrams. In Fig. 2 point 0 is the neutral point of a three-phase system represented by the circuit whose conductors are 1, 2, and 3 of Fig. 1. The vector 0—1 is the phase voltage or voltage to neutral of the conductor 1 and likewise the vectors 0—2 and 0—3 are the phase voltage or voltages to neutral of the conductors 2 and 3. Vector $V_{1-2}$ represents the line-to-line voltage between the conductors 1 and 2 and is the voltage supplied to the electro-responsive device 9. Vector $V_3$, which corresponds to vector 0—3, is the line-to-neutral voltage of the conductor 3. At unity power factor the phase voltage and phase current are in phase with each other so that at unity power factor the current in conductor 3 would be in phase with the vector 0—3 and as can be seen from the diagram 0—3 is in quadrature or at right angles to the line-to-line voltage $V_{1-2}$. Assume, however, that the power factor is not unity and that the actual current in the conductor 3 is represented by the vector $I_3$. With a phase rotation 1, 2, 3, this corresponds to a leading current.

Referring now to Fig. 3, vectors $V_{1-2}$, $V_3$ and $I_3$ correspond to the like vectors in Fig. 2. The vector $I_3 R_L$ corresponds to the resistance drop in the line caused by the current $I_3$ while the vector $I_3 X_L$ corresponds to the reactance drop in the line produced by the current $I_3$. The resultant of these two drops produces the impedance drop $I_3 Z_L$ in the line caused by the current $I_3$. This impedance drop represents the difference in phase voltage of conductor 3 between the regulator and the load center which is produced by the current flowing through the impedance of the line. Consequently this is the line drop which is to be compensated for. For example, if $V_3$ in Fig. 3 represents the phase voltage of conductor 3 at the load center then the vector sum of $V_3$ plus $I_3 Z_L$ will represent the phase voltage of conductor 3 which must be held by the regulator.

If now we extend the resistance drop vector $I_3 R_L$ until it corresponds in magnitude to the reactance drop $I_3 X_L$ we obtain the vector $I_3 R_c$ which, assuming a unity ratio of transformation, potential transformer 11, will then correspond to the drop in the resistance element of the line drop compensator. If to the end of this we add a reverse reactance drop $I_3 X_c$ equal in magnitude to the original resistance drop $I_3 R_L$ in the line we will obtain by adding these two vectors a resultant line drop compensator impedance drop $I_3 Z_c$.

From the well known geometrical proposition that the sum of the internal angles of a triangle equals 180 degrees, it follows that the angle between the true line impedance drop $I_3 Z_L$ and the compensator impedance drop $I_3 Z_c$ is 90 degrees. Therefore, as the angle between the phase voltage of $V_3$ and the line-to-line voltage $V_{1-2}$ is also 90 degrees the line impedance drop bears the same relation to the phase voltage of the circuit as the compensator impedance drop bears to the line-to-line voltage between the conductors 1 and 2. The latter is the voltage supplied to the electro-responsive winding 10. Consequently, the arrangement shown in Fig. 1 gives correct line drop compensation.

The reversal of the direction of the compensator reactance drop $I_3 X_c$ relative to the line reactance drop $I_3 X_L$ is obtained, as already explained, by reversing the connections of the primary winding 17 of the reactance transformer of Fig. 1 while the simple inverse setting or adjustment of the magnitude of the resistance and reactance components of the compensator impedance relative to the same component of the line impedance is obviously easily done and as pointed out above can be done unconsciously by merely reversing the labels on the outside of the compensator box.

In the modification shown in Fig. 4 the resistance element of an ordinarily connected compensator is reversed relative to the reactance element by reversing the connections of the primary winding 14 and the secondary connections of the current transformer 18 are reversed. In Fig. 3 the first reversal mentioned above would amount to reversing the vector $I_3 R_c$ and also the vector $I_3 X_c$. Obviously this would give a resultant which would be along the line of the impedance drop $I_3 Z_c$ and by reversing the current transformer connections this impedance drop vector is reversed so that the result is exactly the same as in Fig. 3 and we get the resultant impedance drop $I_3 Z_c$.

In Fig. 5 a simplified line drop compensator is shown in which the secondary of the current transformer is connected directly across the resistance 13 and across an adjustable electric condenser or capacitor 20. As the reactance drop across a capacitor is reversed or 180 degrees out of phase with respect to the drop across an inductance the reversal of the reactance element is accomplished in this manner.

While my invention is particularly adapted to three-phase ungrounded neutral circuits, it should be understood that it is in no sense limited to use with such circuits and it can be used with polyphase circuits of any number of phases, regardless of whether the neutral of such circuits is grounded or not.

While I have shown and described particular embodiments of my invention, it will be obvious to those skilled in the art that changes and modifications may be made, and I, therefore, aim in the appended claims to cover all such changes and modifications as fall within the true spirit and scope of my invention.

What I claim as new and desire to secure by Letters Patent of the United States, is:

1. In combination, an alternating current circuit, an electro-responsive device connected to respond to the voltage of said circuit at a particular place, line drop compensating means for said electro-responsive device, said compensating means having a resistance element and a reactance element, and means for energizing said line drop compensating means from said circuit with a total operating current which is in quadrature at unity power factor with the voltage of said circuit to which said device responds, the values of the resistance and reactance elements of said compensation being proportional, respectively, to the reactance and the resistance of said circuit.

2. In combination, an alternating current circuit, an electro-responsive device connected to respond to the voltage of said circuit at a particular place, line drop compensating means for said electro-responsive device, said compensator having relatively reversed resistance and reactance elements, and means for energizing said line drop compensating means from said circuit with a current which is in quadrature at unity power factor with the voltage of said circuit to which said device responds, the values of the resistance and reactance elements of said compensator being proportional, respectively, to the reactance and the resistance of said circuit.

3. In combination, an alternating current circuit, an electro-responsive device, means including a line drop compensator for connecting said device across said circuit at a particular place thereon so that it will be responsive to the voltage at a relatively remote place on said circuit, said compensator having a resistance element and a negative or reversed reactance element, and means for passing through said compensator a current derived from the current in said circuit and which is in quadrature with the voltage across said circuit at the place where said device is connected thereto at unity power factor in said circuit, said compensator having a ratio of effective resistance to reactance values which is equal to the ratio of the reactance to the resistance of said circuit between said places.

4. In combination, an alternating current circuit, an electro-responsive device, means including a line drop compensator for connecting said device across said circuit at a particular place thereon so that it will be responsive to the voltage at a relatively remote place on said circuit, said compensator having a resistance element and a capacitive reactance element, and means for passing through said compensator a current derived from the current in said circuit and which is in quadrature with the voltage across said circuit at the place where said device is connected thereto at unity power factor in said circuit, said compensator having a ratio of effective resistance to reactance values which is equal to the ratio of the reactance to the resistance of said circuit between said places.

5. In a system for regulating the voltage of an isolated neutral balanced three-phase circuit, an electro-responsive regulator controller connected between two of the conductors of said circuit, a line drop compensator for said device, said compensator having relatively reversed resistance and reactance elements, a current transformer for energizing said compensator in accordance with the current in the third conductor of said circuit, said compensator having an inverse setting so that the resistance drop therein corresponds to the reactance drop in said circuit and the reactance drop therein corresponds to the resistance drop in said circuit.

6. In a system for regulating the voltage of an isolated neutral balanced three-phase circuit, an electro-responsive regulator controller connected between two of the conductors of said circuit, a line drop compensator for said device, said compensator having a resistance element and a reversed inductive reactance element, a current transformer for energizing said compensator in accordance with the current in the third conductor of said circuit, said compensator having an inverse setting so that the resistance drop therein corresponds to the reactance drop in said circuit and the reactance drop therein corresponds to the resistance drop in said circuit.

ZOLTAN O. ST. PALLEY.